Figure 1:
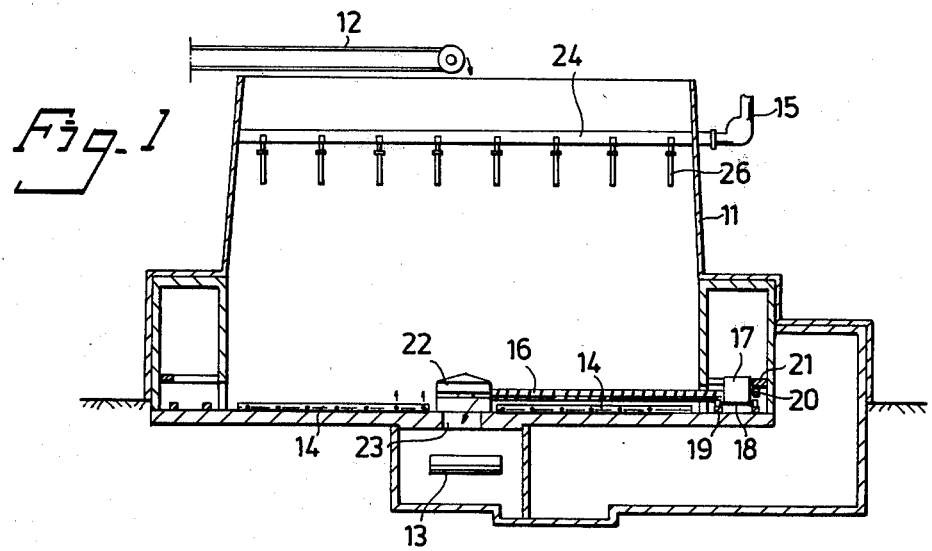

United States Patent [19]

Nordlund et al.

[11] 4,384,878

[45] May 24, 1983

[54] METHOD AND APPARATUS FOR COMPOSTING COMPOSTABLE ORGANIC MATERIALS SUCH AS ORGANIC WASTES AND STRONGLY AQUEOUS FOSSILE MATERIALS

[75] Inventors: Tore Nordlund, Torshälla; Lars Ljungkvist, Upsala, both of Sweden

[73] Assignee: Armerad Betong Vagforbattringar AB, Stockholm, Sweden

[21] Appl. No.: 372,212

[22] Filed: Apr. 26, 1982

Related U.S. Application Data

[63] Continuation of Ser. No. 175,085, Aug. 4, 1980, abandoned, which is a continuation-in-part of Ser. No. 85,531, Oct. 17, 1979, abandoned.

[51] Int. Cl.³ .......................... C05F 9/04; C05F 11/00
[52] U.S. Cl. ............................................ 71/9; 71/8; 71/12; 71/22; 435/313; 435/813; 422/184
[58] Field of Search .................. 71/8, 9, 12, 13, 21, 71/22; 435/313, 813; 422/184, 232; 210/620, 628

[56] References Cited

U.S. PATENT DOCUMENTS

| | | | |
|---|---|---|---|
| 2,474,833 | 7/1949 | Eweson | 71/9 |
| 3,960,537 | 6/1976 | Kaelin | 71/9 |
| 4,062,770 | 12/1977 | Kheer | 71/9 X |
| 4,184,269 | 1/1980 | Kheer | 71/9 X |
| 4,203,755 | 5/1980 | Ruckstuhl | 71/9 |
| 4,236,910 | 12/1980 | Norin et al. | 210/620 X |

FOREIGN PATENT DOCUMENTS

| | | | |
|---|---|---|---|
| 2709715 | 9/1978 | Fed. Rep. of Germany | 71/12 |
| 2721349 | 11/1978 | Fed. Rep. of Germany | 71/9 |

Primary Examiner—Kenneth M. Schor
Attorney, Agent, or Firm—Fred Philpitt

[57] ABSTRACT

In a method of continuously composting material capable of being composted by the action of aerobic microorganisms in a reactor, the material is caused to pass through the reactor as a single mass from the top thereof to the bottom thereof from an upper level in said reactor, and in which oxygen-containing gas required for the aerobic decomposition of the compostable material is passed through said single mass in contact therewith. The waste gas from the composting process is removed from the reactor by suction through pipes which extend down into the mass to be composted from the upper level thereof, with the openings of said pipes lying on a level located beneath said upper level in said reactor. A pressure is maintained in said pipes of such magnitude as to cause oxygen-containing gas to pass from said upper level of the reactor through the layer of compostable material extending down to the openings of said tubes, said addition of oxygen-containing gas to the compostable material being intended to start the decomposition process.

3 Claims, 4 Drawing Figures

U.S. Patent  May 24, 1983  Sheet 1 of 2  4,384,878

METHOD AND APPARATUS FOR COMPOSTING COMPOSTABLE ORGANIC MATERIALS SUCH AS ORGANIC WASTES AND STRONGLY AQUEOUS FOSSILE MATERIALS

This is a continuation of application Ser. No. 175,085, filed Aug. 4, 1980 and the benefits of 35 USC 120 are claimed relative to it which in turn is a continuation-in-part of our earlier application Ser. No. 85,531, filed Oct. 17, 1979, both applications being now abandoned.

The invention is directed to a method of and an apparatus for continuously composting, that is, digesting, compostable organic materials such as organic wastes and strongly aqueous fossile materials. The method is of that kind in which the material to be digested is caused to pass downwardly through a reaction vessel and is aerated by air introduced in the lower end of said reaction vessel, the quantity of air being regulated in accordance with measured values obtained within the reaction vessel.

In the composting or digesting of organic wastes, so called aerobic digestion has been widely adopted and such processes are practically odorless because the active bacteria used has an affinity for oxygen. The aerobic digestion also develops higher temperatures in the process than the so-called anaerobics which are active in oxygendeficient environments and generate very offensive odor conditions. The generation of high temperatures is important for sterilizing the material being digested or composted.

More specifically the material being digested is passed in the reaction vessel from the top thereof from an upper level therein while meeting a gas rich in oxygen, preferably air, for digesting the material with the aid of aerobic microorganisms. By organic waste material is especially meant such materials as bark, wood chips, animal cancellings, sewage sludge and the like, although other materials not having the character of waste can be considered, i.e. such materials as peat and similar fossile materials. By "sewage sludge" is meant sewage sludge taken from sewage purification works and like works.

Methods of the kind described above are known to the art. In one such method the material to be composted is introduced into the top of a reactor and the oxygen-containing gas required to maintain the activity of the aerobic microorganisms is introduced to the bottom of the reactor and caused to pass upwardly through said reactor in counterflow to the solid material, which is permitted to fall slowly down through the reactor, said material being removed from the bottom of said reactor. The material to be composted is preferably a mixture of refused material and sewage sludge and the retention time of the material in the reactor may be in the range of from 2 to 4 weeks.

The treated waste materials may be discharged through an outlet by a rotating discharge screw conveyor which moves the materials to the outlet. Air inlet openings are provided in the bottom of the reactor for permitting air to counterflow upwardly through the material column with the amount of air supplied being determined by a control device. The quantity of air supplied can be controlled as a function of the following: The temperature of the contents of the reaction vessel and the $CO_2$ content in the air withdrawn from the top of the reactor. If this content is adjusted to a value between 2 and 6 percent of $CO_2$ in the gases leaving the column of the reactor then the reaction will take place in a satisfactory manner. If there is an excessive supply of air to the reactor then the material within the vessel will become dry and the bacterial activity will collapse. If too little air is suplied, the amount of anaerobic microorganisms increases greatly. If the supply of air is regulated to a $CO_2$ content in the gases leaving the reactor within the range given above, then the reaction will take place without these drawbacks taking place. U.S. Pat. Nos. 4,062,770 and 4,184,269 are referred to as prior art describing processes of which the present process according to the invention represents an improvement.

A disadvantage with processes based on the waste gas being taken out from the top of the reactor is that this waste gas has to pass a layer of material to be composted which is still relatively cold. Since the waste gas contains steam, and under certain circumstances may be saturated therewith, it may be difficult to avoid steam condensing in the upper, colder layer of material in the reactor. This may result in said layer being enriched with water. This water causes the layer to become more compact, thereby rendering passage of the gases therethrough more difficult, and increasing the amount of power required to drive the fans etc.

These disadvantages and drawbacks can be avoided by removing the waste gas from the reactor at a zone which lies beneath the upper level of the solid material in the container.

The present invention is thus an improvement of the known method of continuously composting material capable of being composted by the action of aerobic microorganisms in a reactor in which method the material is caused to pass through the reactor as a single mass from the top thereof to the bottom thereof from an upper level in said reactor and in which oxygen-containing gas, preferably air, required for the aerobic decomposition of the compostable material is passed through said single mass in contact therewith. The improvement comprises removing the waste gas from the composting process from the reactor by suction through pipes which extend down into the mass to be composted from the upper level thereof with the opening thereof at a level located beneath said upper level in said reactor and maintaining such a pressure in said pipes as to cause oxygen-containing gas to pass from said upper level of the reactor through the layer of compostable material extending down to the openings of said tubes, said addition of oxygen-containing gas to the compostable material being intended to start the decomposition process.

The invention is also concerned with an apparatus for aerating organic materials selected from the group which comprises organic waste materials and highly aqueous fossile materials to transform the material into a compost, comprising a stationary container having an upper end, a lower end and one or more side walls extending between said upper and lower ends, said upper end having an inlet opening for the material to be aerated, said lower end having an outlet opening for the compost so that the material to be treated flows downwardly through said reactor, means located in the lower end of said container for moving the compost in the lower end to said outlet opening, means for supplying air into the material column at the lower end of said container for flow upwardly through the material column, and means for controlling the flow of air into the material column.

The improvement of the invention resides in that means are arranged for the removal by suction of waste gases at a level located beneath the upper level of the material to be treated. The stationary container may be cylindrical or rectangular in shape.

When the gas discharged during a composting process is removed by suction from the zone below the upper level of the material in the container, with the aid of one or more tubes which are open within the zone and in this connection a sufficiently high sub-pressure is maintained in the tube or tubes, an oxygen-containing medium can also be caused to pass concurrently to the material in the container. It is hereby achieved that an excess of oxygen-containing medium, preferably air, is supplied to that zone of the container in which the composting process requires most oxygen gas. Another advantage is that it is ensured to a much higher degree than in the process above that obnoxious components, which might cause discomfort to those in the vicinity, are not discharged from the container. Still another advantage is that the process makes it possible to recover the heat contained in the gases discharged by suction. For this purpose, a heat exchanger can be inserted in the suction system.

According to the invention it has been found preferable to control the composting process by measuring the carbondioxide content of gases discharged from the composting process. If it is found that the process is not proceeding satisfactorily, for example, more carbonasceous material, such as sawdust, can be introduced into the compostable material. It is also possible to change the moisture content of the material by adding water thereto.

Figure 2:
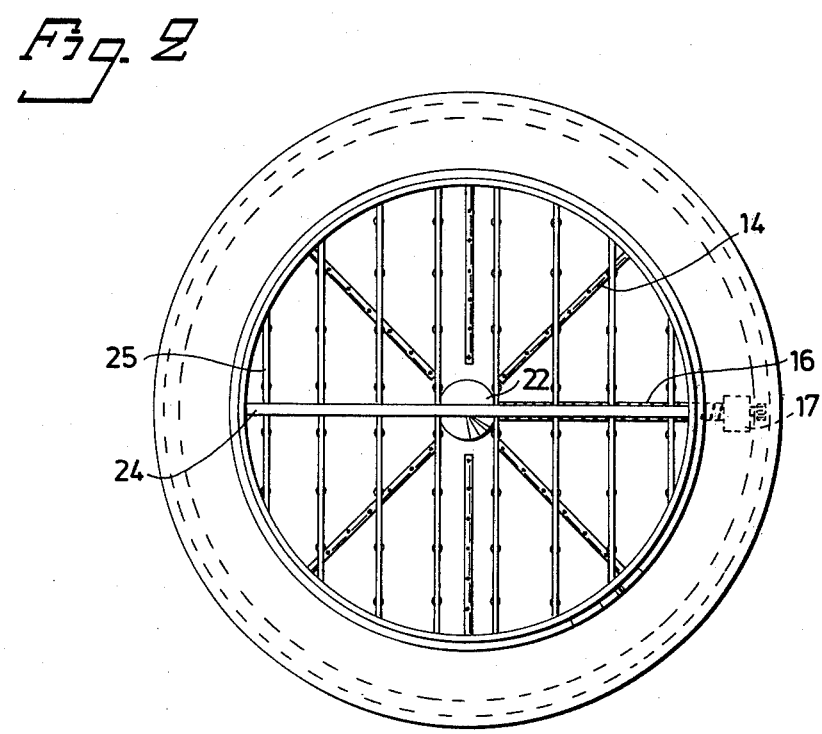

The invention will now be described in more detail with reference to the accompanying drawing in which FIG. 1 is a schematic view of a plant for carrying out the process according to the invention, FIG. 2 is a top plan view of the plant for carrying out the composting process shown in FIG. 1.

Figure 3:
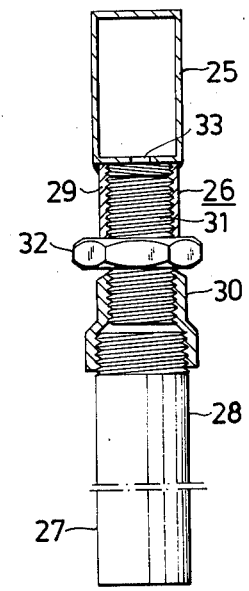
Figure 4:
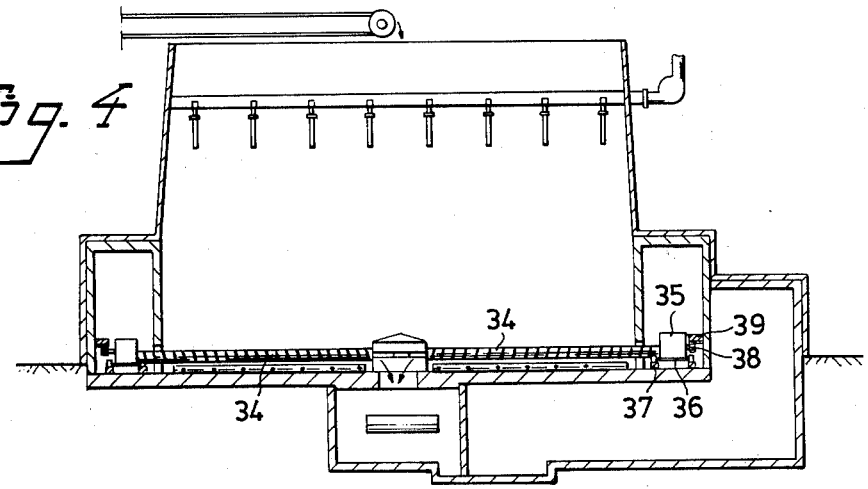

FIG. 3 illustrates in more detail a nozzle for removing waste gases by suction, and FIG. 4 is a schematic view of a modified plant for carrying out the process according to the invention.

With reference to FIG. 1 of the drawing, there is shown a reactor for composting a mixture of sewage sludge and organic waste material. This reactor comprises an upwardly open container 11 into which material to be composted is fed by an infeed transport belt 12. The material to be composted forms a single mass descending from the top of the reactor to the bottom thereof. The composted material is discharged from the bottom of the container 11 by means of an outfeed transport belt 13. The air required to effect the composting process is blown into the single mass of compostable material through suitable pipes 14 by means of a blower (not shown). The supply of air is adjusted to obtain a waste gas at the top of the container having a $CO_2$ content amounting to about 5 percent. The carbon dioxide-containing waste gases formed in the composting process are removed from the top of the container by means of a blower 15.

The mass undergoing composting is permitted to descend through the reactor 11 towards the bottom. At a small distance from the bottom, there is arranged a rotatable, turnable screw 16 which is caused to turn over the whole surface of the bottom by means of an electric motor 17 arranged on a carriage 18 which is in turn arranged to walk on two parallel rails 19 arranged along a circular path at the inside wall of the reactor. The motor causes the screw 16 to rotate and to turn around the central point of the reactor. For this purpose motor 17 has a gear wheel 20 which engages a circular stationary gear ring 21 at the wall of the reactor. The turning screw 16 is carried in a rotating bearing means 22 at the central point of the reactor. When the screw 16 is rotated it will cut off a thin layer of the composted material while finely dividing the latter. The finely divided material is caused to move to a discharge opening 23 at the central point of the reactor where it is caused to fall down onto the outfeed transport belt 13. As will be understood, the operation of the reactor is continuous, new material being fed into the upper side of the single mass of the reactor at a rate corresponding to that at which composted material is discharged.

Arranged below the upper level of the material undergoing a composting process, at the top of the container, are means of the kind illustrated in FIGS. 1, 2 and 3, i.e. a collecting line 24 and branch lines 25 extending therefrom, nozzle means 26 being attached to the latter to enable gases formed during the composting to be removed by suction, beneath the upper level of material in the container 11.

The coupling means comprise an outer upper sleeve 29 which is welded to the branch line 25, and an outer lower sleeve 30 in which a pipe 28 is screwed. The two sleeves 29, 30 are held together by means of an internally screw-threaded connecting sleeve 31 having a hexagonal nut 32 fixedly connected thereto. Thus, when turning the nut 32 in one direction, the pipe 28 is lowered somewhat to a lower level. The lower external sleeve 30 can be loosened from the connecting sleeve 31 by means of a pair of pliers, an operation which requires the hexagonal nut 32 to be held firmly.

The object of arranging the pipes 28 in the manner described, with the possibility of regulating the level at which the end 27 of respective pipes is located, is to obtain, when drawing air by suction through the branch lines 25 and the collecting line 24, a uniform distribution of through-passing gas over the whole cross-sectional area of the layer in the container between the upper level of the mass being composted and the zone to which each end 27 of the nozzles extend. Through the constrictions 33 in each nozzle 26 there is established a resistance in said nozzle which is high compared with the resistance of the gas in the layer. In this way, compensation is made for changes in pressure and it is ensured that the flowing gas is distributed uniformly over the surface of said layer, so that all compostable material comes into effective contact with the air fed to the process.

In FIG. 4 there is shown a reactor which has a rectangular configuration in cross-section. At the bottom thereof, are arranged two walking screws 34 which are caused to move reciprocingly between the two opposite walls of the reactor. Movement of the screws parallel with their movement path is effected by means of an electric motor 35 which is of the same kind as that in FIG. 1 and which is moved by a carriage 36 on two straight rails 37. A gear wheel 38 coupled to the motor 35 meshes with a gear rack 39, thereby to effect the movement in parallel of the walking screws together with the movement of rotation. Each walking rotating screw is provided with a gear wheel at the opposite end thereof, said gear wheel being arranged to engage a gear rack to effect the parallel movement of the screw (The gear wheel and the gear rack are not shown in the drawing).

In other respects, the operation of the reactor in connection with composting materials is similar to the operation of the reactor in FIG. 1.

What is claimed is:

1. A method of continuously composting material capable of being composted by the action of aerobic microorganisms in a reactor, said method comprising the steps of:
   (a) introducing said material into the upper portion of said reactor, passing the material downwardly through said reactor, and collecting the material as a mass having an upper layer located below the upper level of the reactor, said material and mass continuously flowing from the top portion of said reactor to the bottom of said reactor; and
   (b) passing a major portion of the oxygen-containing gas required for aerobic decomposition of the compostable material countercurrently through said continuously flowing mass and in contact therewith, and maintaining reactor conditions such that composting of the mass is effected;
   (c) removing substantially all waste gas produced by said composting process from said reactor by suction through pipes which extend down into said mass from the upper level in said reactor, the openings of said pipes being arranged slightly below the upper layer of said mass at a level located beneath said upper level in said reactor; and
   (d) drawing through the upper level of said reactor concurrent to the flow of the mass, a minor portion of oxygen-containing gas;
   (e) maintaining simultaneously with said removing step, adequate negative pressure in said pipes as to cause the supplemental and minor portion of oxygen-containing gas, which has been introduced into said reactor, to pass from said upper level in said reactor, through the upper layer of said mass into which said pipes extend downwardly, and to said openings of said pipes, said passing of oxygen-containing gas from said upper level through said layer of said mass both starting the decomposition process and providing oxygen-containing gas to the composting area requiring the most oxygen-containing gas.

2. A method as set forth in claim 1 wherein the oxygen-containing gas is air.

3. A method as set forth in claim 1 or 2, wherein the waste gas removed by suction from the composting process is caused to pass through a constriction in the pipes, said constriction producing a resistance to the flow of gas that is great as compared with the resistance of gas in the single mass between the upper level and the lower end of the pipes, thereby to compensate for any differences in gas resistance.

* * * * *